United States Patent [19]

Sanada

[11] Patent Number: 5,473,489
[45] Date of Patent: Dec. 5, 1995

[54] MAGNETIC HEAD POSITIONER FOR A MAGNETIC DISK APPARATUS MINIMIZING THERMAL OFFTRACK

[75] Inventor: Yotaro Sanada, Tokyo, Japan

[73] Assignee: NEC Corporation, Tokyo, Japan

[21] Appl. No.: 300,134

[22] Filed: Sep. 2, 1994

[30] Foreign Application Priority Data

Sep. 2, 1993 [JP] Japan .................... 5-218474

[51] Int. Cl.$^6$ ................................................ G11B 33/14
[52] U.S. Cl. ................................... 360/106; 360/97.02
[58] Field of Search ................................ 360/105, 106, 360/109, 97.02, 97.03

[56] References Cited

U.S. PATENT DOCUMENTS

| | | | |
|---|---|---|---|
| 4,717,977 | 1/1988 | Brown | 360/135 X |
| 5,050,026 | 9/1991 | Goss | 360/106 |
| 5,161,077 | 11/1992 | Jabbari | 360/106 |
| 5,251,085 | 10/1993 | Morris et al. | 360/106 |
| 5,301,078 | 4/1994 | Makino et al. | 360/106 |

FOREIGN PATENT DOCUMENTS

| | | | |
|---|---|---|---|
| 62-103878 | 5/1987 | Japan | 360/106 |
| 9308563 | 4/1993 | WIPO | 360/106 |

Primary Examiner—Robert S. Tupper
Assistant Examiner—William J. Klimowicz
Attorney, Agent, or Firm—Young & Thompson

[57] ABSTRACT

A magnetic head positioner for a magnetic disk apparatus has an arm holder rotatably supported on a shaft by a plurality of bearings. The arm holder provides a plurality of arms carrying magnetic heads for writing and reading data at tip ends thereof. A first cylindrical sleeve is interposed between the bearings and the arm holder and fixed to the outer peripheral surface of the bearings. The first cylindrical sleeve is also made of a material having a linear expansion coefficient substantially the same as that of the shaft. A pair of second cylindrical sleeves are interposed between the bearings and the arm holder and fixed to the first cylindrical sleeve at one end portion thereof and to the inner peripheral surface of the arm holder at the other end portion thereof. The pair of second cylindrical sleeves are also made of a material having substantially the same linear expansion coefficient substantially as that of the arm holder. Thermal offtracking of the magnetic heads with respect to the disk is thus minimized.

3 Claims, 4 Drawing Sheets

MAGNETIC HEAD POSITIONER FOR A MAGNETIC DISK APPARATUS MINIMIZING THERMAL OFFTRACK

BACKGROUND OF THE INVENTION

1. Field of the Invention

The present invention relates to a magnetic disk apparatus to be used in an information processing system, and more particularly to a magnetic head positioner which can prevent an arm holder providing a plurality of magnetic heads from causing thermal deformation due to variation of ambient temperature.

2. Description of the Related Art

The detail of a conventional magnetic head positioner of a magnetic disk apparatus has been disclosed in U.S. Pat. No. 5,161,077, for example. The conventional magnetic head positioner of the magnetic disk apparatus will be discussed hereinafter with reference to FIGS. 3 and 4.

FIG. 4 is a graph showing experimental data of thermal off track of the conventional magnetic head positioner at a predetermined ambient temperature. The abscissas axis of the graph shown in FIG. 4 represents an average value of the result of measurement of the thermal off track of the magnetic head at the predetermined ambient temperature T. On the other hand, the ordinate axis of the graph shown in FIG. 4 represents head numbers given to a plurality of magnetic heads shown in FIG. 3 in ascending order from the lowermost one.

Referring to FIG. 3, the conventional magnetic head positioner includes a shaft 101, a plurality of bearings 102, an arm holder 103, arms 104, magnetic heads 105, a voice coil 106 and a sleeve 107.

The shaft 101 is fixedly arranged within the magnetic disk apparatus. The shaft 101 also functions as a center axis for rotation of the magnetic heads and is made of a material including a stainless steel.

The plurality of bearings 102 are arranged in axial direction with maintaining a predetermined distance to the shaft 101.

The arm holder 103 is rotatably supported about the shaft 101 by the bearings 102 in order to rotate thereabout. The plurality of arms 104 protrude perpendicularly from the outer surface of the arm holder 103. Each arm 104 provides the magnetic head 105 at tip end thereof for writing and reading data with respect to a magnetic disk medium 108.

The voice coil 106 is mounted on the outer peripheral surface of the arm holder 103 at the opposite side to the plurality of arms 104. The voice coil 106 also functions to generate a driving force to rotate the arm holder 103 about the shaft 101.

The cylindrical sleeve 107 is interposed between the outer peripheral surfaces of the plurality of bearings 102 and the inner peripheral surface of the arm holder 103.

However, the foregoing conventional magnetic head positioner has some the following disadvantages.

In general, the shaft, the plurality of bearings, the arm holder and the sleeve to be used in the magnetic head positioner are formed of mutually different materials having difference physical characteristics, such as Young's modulus, linear expansion coefficient and so forth.

For instance, when the arm holder and the sleeve are formed of the same material, the shaft and the sleeve may expand in the axial direction depending upon their linear expansion coefficient if the ambient temperature is varied significantly. Therefore, due to difference of linear expansion of the shaft and the sleeve, it is possible to cause releasing of pre-load on the bearings or operation of excess load on the bearings.

On the other hand, when the bearings and the sleeve are formed of the same material, the bearings and the arm holder may cause thermal deformation in magnitudes depending upon their linear expansion coefficients according to rising of the ambient temperature. Since the linear expansion coefficients are different in the sleeve and the arm holder, a thermal stress is generated at the contacting portion between the sleeve and the arm holder to cause thermal off track of the magnetic heads mounted on the arm holder.

Furthermore, with reference to FIG. 4, an absolute value of the thermal off track magnitude of the magnetic head 105 at the predetermined ambient temperature T is approximately 2.3 μm. Also, comparing the thermal off track magnitude of respective magnetic head 105, a difference of the thermal off track magnitude of the head No. 1 and head No. 10 is large. This phenomenon means that the uppermost portion of the arm holder 103 is inclined toward inside of the magnetic disk medium 108 in a greater magnitude than the lowermost portion thereof. On the other hand, the thermal off track magnitudes of the head Nos. 6, 7 and 8 are considerably larger than that of other heads, respectively. This phenomenon means that the central portion of the arm holder 103 extends toward inside of the magnetic disk medium 108 in a greater magnitude than the uppermost and lowermost portions thereof. Namely, the arm holder 103 is deformed in arch shape at the center portion thereof.

SUMMARY OF THE INVENTION

It is therefore an object of the present invention to eliminate the above-mentioned disadvantages and provide a magnetic head positioner for a magnetic disk apparatus which can prevent an arm holder mounting magnetic head from causing thermal deformation due to variation of ambient temperature and reduce thermal off track magnitude of the magnetic heads.

According to the present invention, a magnetic head positioner for a magnetic disk apparatus has:

an arm holder rotatably supported on a shaft by bearings and providing a plurality of arms carrying magnetic heads for writing and reading data at tip ends thereof;

a first cylindrical sleeve interposed between the bearings and the arm holder, fixed to an outer peripheral surface of the bearings, and being made of a material having a linear expansion coefficient substantially similar to that of the shaft; and a second cylindrical sleeve interposed between the bearing and the arm holder, fixed to the first cylindrical sleeve at one end portion thereof and to an inner peripheral surface of the arm holder at the other end portion thereof, and being made of a material having a linear expansion coefficient substantially similar to that of the arm holder.

The second cylindrical sleeve is fixed to the inner peripheral surface of the arm holder with a predetermined minimized contact area. The first and second cylindrical sleeves are fixed to each other by means of an adhesive including epoxy resin. In the alternative, the first cylindrical sleeve has first grooves for engaging with the second cylindrical sleeve at both ends, the second cylindrical sleeve has a second groove engaging with the first cylindrical sleeve at one end, and the first and second cylindrical sleeves are fixed to each other by press fitted with engaging the first and second grooves.

The above objects and features of this invention will become more apparent from the following detailed description when taken in conjunction with the attached drawings.

BRIEF DESCRIPTION OF THE DRAWINGS

The present invention will be understood more fully from the detailed description given herebelow and from the attached drawings of the preferred embodiment of the present invention, which, however, should not be taken to be limitative to the invention, but are for explanation and understanding only.

In the drawings.

DETAILED DESCRIPTION OF THE PREFERRED EMBODIMENT

The present invention will be discussed in detail in terms of the preferred embodiment of the present invention with reference to FIGS. 1 and 2. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

Figure 1:
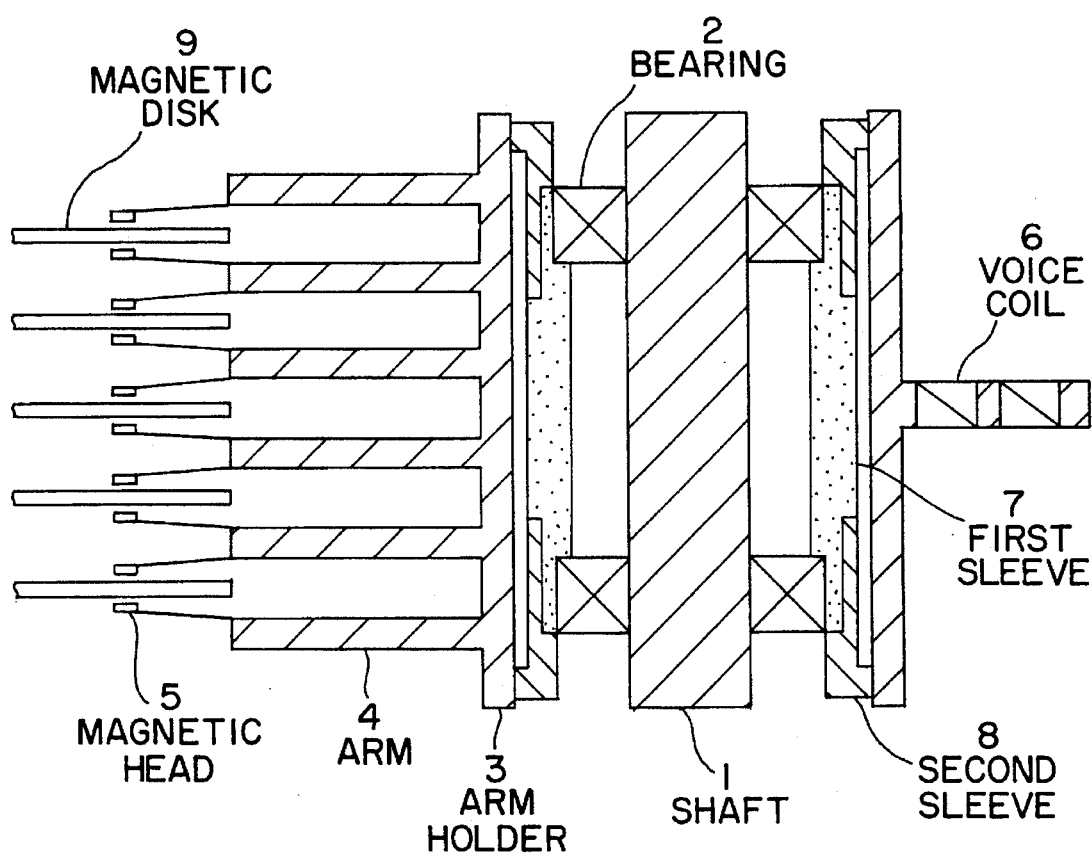
FIG. 1 is a cross-sectional view of an embodiment of a magnetic head positioner for a magnetic disk apparatus according to the present invention.

Referring to FIG. 1, an embodiment of a magnetic head positioner according to the present invention has a shaft 1 made of a material including stainless steel, an arm holder 3 rotatably supported on the shaft 1 by a plurality of bearings 2 and providing a plurality of arms 4 carrying magnetic heads 5 for writing and reading data in and from a magnetic disk medium 9 at tip end thereof, a voice coil 6 generating a driving force to rotate the arm holder 3 about the shaft 1, a first cylindrical sleeve 7 interposed between an outer peripheral surface of the plurality of bearings 2 and an inner peripheral surface of the arm holder 3, and being made of a material having a linear expansion coefficient substantially similar to that of the shaft 1, and a second cylindrical sleeve 8 interposed between the outer peripheral surface of the plurality of bearings 2 and the inner peripheral surface of the arm holder 3 and being made of a material having a linear expansion coefficient substantially similar to that of the arm holder 3.

The shaft 1 is fixedly arranged within the magnetic disk apparatus and functions as a center axis for rotation of the magnetic heads 5. The shaft 1 is also made of a material including stainless steel. For instance, the shaft 1 may be made of SUS303 or SUS416. Here, SUS303 and SUS416 are designations in Japan Industrial Standard (JIS) representative of chemical kind of the stainless steel. The linear expansion coefficients of SUS303 and SUS416 are approximately $17.3 * 10^{-6}$ [1/deg] and $9.9 * 10^{-6}$ [1/deg] at the ambient temperature of 0–100[ deg], respectively.

The plurality of bearings 2 are arranged in axial direction with maintaining a predetermined distance to the outer surface of the shaft 1. The bearings 2 are also made of a material including stainless steel having a linear expansion coefficient substantially similar to that of the shaft 1. For instance, the bearings 2 may be formed of SUS303 or SUS416.

The arm holder 3 is rotatably supported about the shaft 1 by the plurality of bearings 2. The plurality of arms 4 protrude perpendicularly from the outer peripheral surface of the arm holder 3. Each arm 4 provides the magnetic head 5 for writing and reading data in and from the magnetic disk medium 9 at the tip end thereof. The arm holder 3 is also made of a material including aluminum. For instance, the arm holder 3 may be formed of A5052, A5056, A6061 or A6063. A5052, A5056, A6061 and A6063 are designations in JIS standard representing chemical kind of aluminum. The linear expansion coefficients of A5052, A5056, A6061 and A6063 are approximately $23.8 * 10^{-6}$ [1/deg], $24.3 * 10^{-6}$ [/deg], $23.6 * 10^{-6}$ [/deg] and $23.4 * 10^{-6}$ [1/deg] at the ambient temperature of 0–100 [deg], respectively.

The voice coil 6 is mounted on the outer surface of the arm holder 3 at the opposite side to the arms 4. Also, the voice coil 6 functions to generate a driving force to rotate the arm holder 3 about the shaft 1.

The first cylindrical sleeve 7 is interposed between the outer peripheral surfaces of the bearings 2 and the inner peripheral surface of the arm holder 3 and fixed to the outer peripheral surfaces of the bearings 2. The first cylindrical sleeve 7 is also made of a material having a linear expansion coefficient substantially similar to that of the shaft 1. For instance, the first cylindrical sleeve 7 may be formed of SUS303 or SUS416.

The second cylindrical sleeve 8 is interposed between the outer peripheral surfaces of the bearings 2 and the inner peripheral surface of the arm holder 3 and fixed to the inner peripheral surface of the arm holder 3. The second cylindrical sleeve 8 is also made of a material having a linear expansion coefficient substantially similar to that of the arm holder 3. For instance, the second cylindrical sleeve 8 may be formed of A5052, A5056, A6061 or A6063.

In general, since the shaft 1 and the arm holder 3 are formed of materials having mutually distinct physical characteristics, such as the linear expansion coefficients and so forth, a stress is generated on the arm holder 3 due to a difference of the physical characteristics according to variation of the ambient temperature to be a cause of thermal off track of a plurality of magnetic heads 5 mounted on the arm holder 3.

In the shown embodiment, in order to reduce the stress to be generated according to variation of the ambient temperature, a buffer member including the first cylindrical sleeve 7 which is fixed to the outer peripheral surfaces of the bearings 2 and formed of the material having a linear expansion coefficient substantially similar to that of the shaft 1 and the second cylindrical sleeve 8 which is fixed to the inner peripheral surface of the arm holder 3 and made of the material having a linear expansion coefficient substantially similar to that of the arm holder 3 and interposed between the bearings 2 and the arm holder 3.

Furthermore, the contacting area between the second cylindrical sleeve 8 and the arm holder 3 is minimized to be as small as possible as shown in FIG. 1.

Therefore, since the shaft 1, a plurality of bearings 2 and the first cylindrical sleeve 7 are formed of the materials having substantially equal linear expansion coefficients (for instance, those may be made of SUS303 or SUS416), it can be successfully avoided to release a pre-load on the bearings 2 or operation of excess load on the bearings 2 per se due to the stress generated according to variation of the ambient temperature.

Similarly, since the arm holder 3 and the second cylindrical sleeve 8 are made of the materials having substantially equal linear expansion coefficient to each other (For instance, those may be made of A5052, A5056, A6061 or A6063), it is possible to prevent the arm holder 3 from deforming per se due to the stress generated according to variation of ambient temperature. As a result, it is possible to reduce thermal off track of the magnetic heads 5 mounted on the arm holder 3.

As shown in FIG. 1, the first cylindrical sleeve 7 and the second cylindrical sleeve 8 are fixed to each other as if a single sleeve member. However, since the first and second cylindrical sleeves 7 and 8 are formed of materials having mutually different linear expansion coefficients, the stress is generated on the second cylindrical sleeve 8 as shown in FIG. 1. In the shown embodiment, by minimizing the contact area between the second cylindrical sleeve 8 and the inner peripheral surface of the arm holder 3, the influence of the stress generated on the second cylindrical sleeve 8 to the arm holder 3 can be minimized.

The first and second cylindrical sleeves 7 and 8 are fixed by adhesive so as not to cause breakage even when slight offset due to difference of the linear expansion coefficient associated with the ambient temperature is caused. In this case, the adhesive including epoxy resin which may not influence to the magnetic heads within the magnetic disk apparatus or the magnetic disk medium even when out gas is generated according to variation of ambient temperature, is preferred. On the other hand, it is possible to form grooves at both ends of the first cylindrical sleeve 7, to form a groove at the other end, and to adjust the external and internal diameters of the sleeves at appropriate sizes so that the first and second cylindrical sleeves 7 and 8 may be fixed to each other by press fitting.

Discussion will be given for results of experiments performed with respect to the shown embodiment, with reference to FIG. 2.

Figure 2:
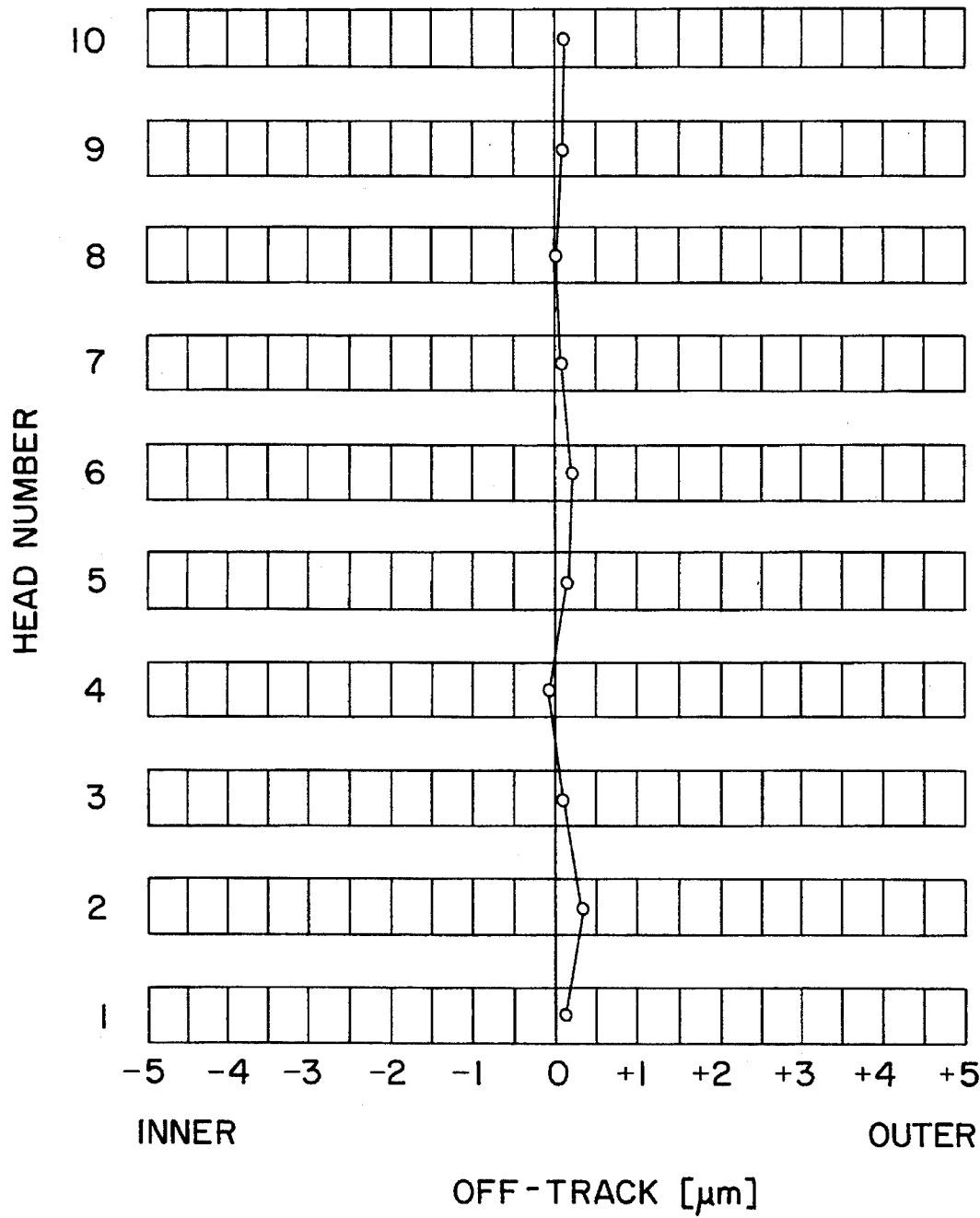
FIG. 2 is a graph showing experimental data of thermal off track at a predetermined ambient temperature T shown in FIG. 1 according to the present invention.
Figure 3:
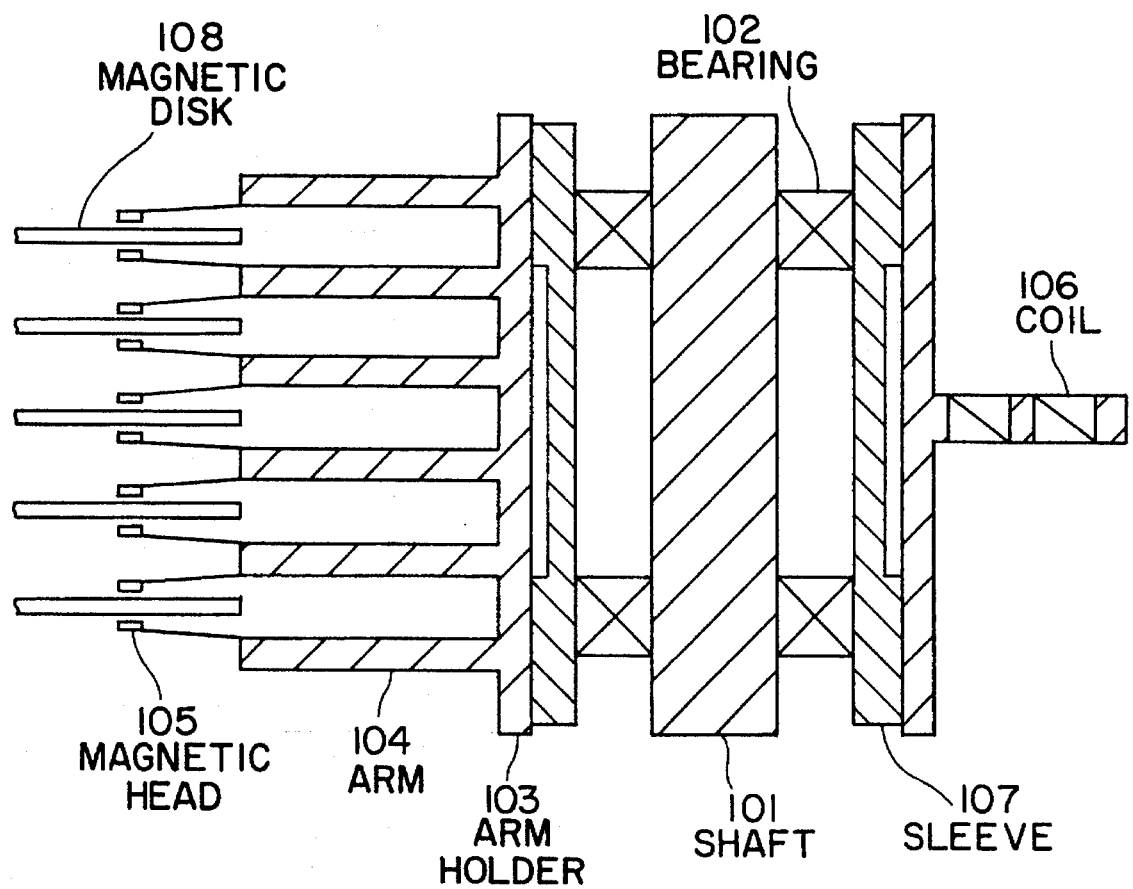
FIG. 3 is a cross-sectional view of the conventional magnetic head positioner.
Figure 4:
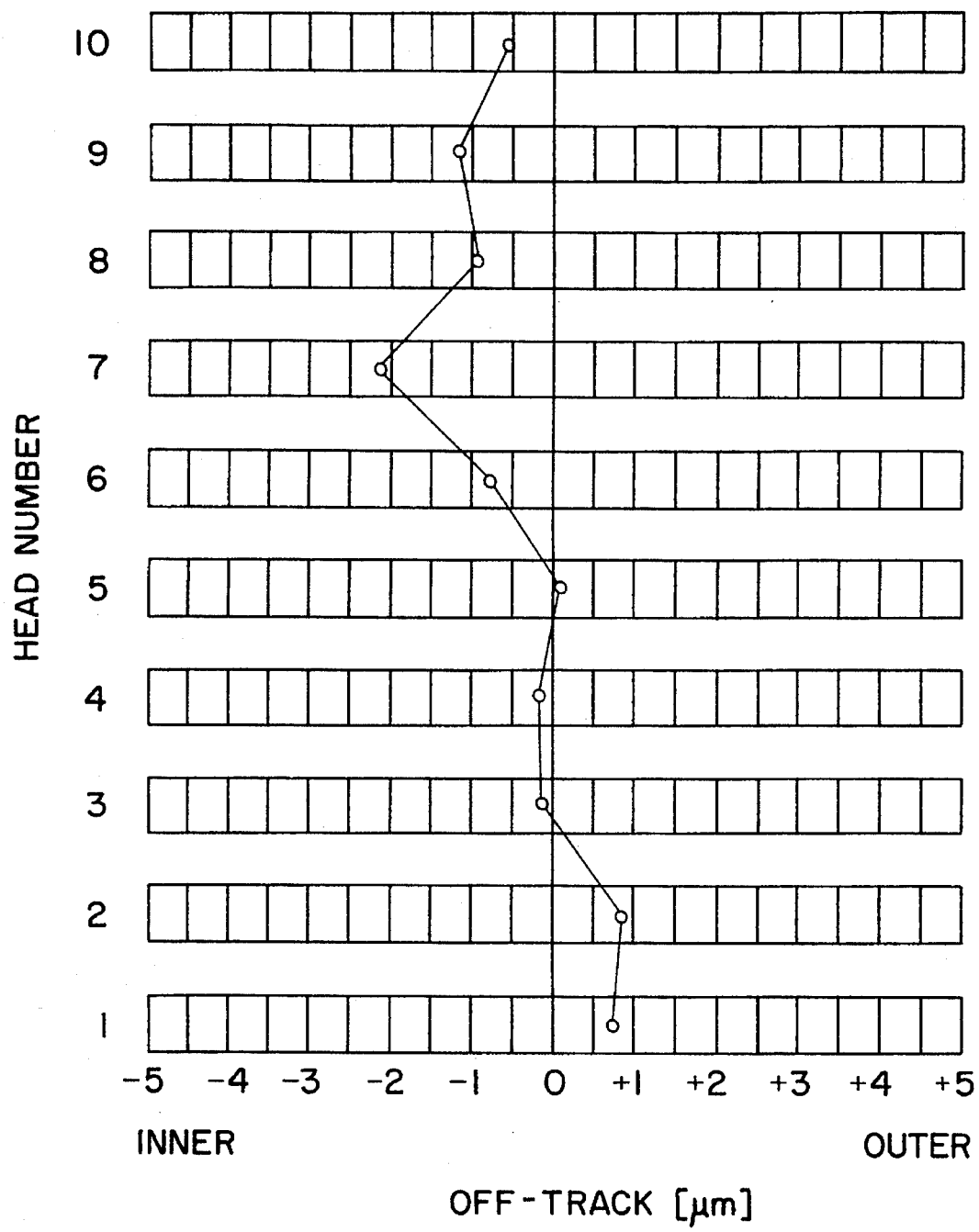
FIG. 4 is a graph showing experimental data of the thermal off track at the predetermined ambient temperature T shown in FIG. 3.

Referring to FIG. 2, the absolute value of the thermal off track magnitude of the magnetic head 5 at the predetermined ambient temperature T is approximately 0.3 μm at most. Comparing the thermal off track magnitude of respective magnetic heads 5, the difference of the thermal off track magnitude in the head No. 1 and the head No. 10 is substantially zero. This means that the uppermost portion and the lowermost portion of the arm holder 3 is not inclined with respect to the magnetic disk medium 9. On the other hand, a difference of the thermal off track magnitudes of the head Nos. 4, 5 and 6 and that of other magnetic heads is substantially zero. This means that the central portion of the arm holder 3 is substantially not extended in comparison with the uppermost and lowermost portions of the arm holder 3. Namely, the arm holder 3 is prevented from deforming in arch shape at the center portion thereof.

As set forth above, the magnetic head positioner of the magnetic disk apparatus according to the present invention employs the first cylindrical sleeve which is fixed to the outer peripheral surface of the bearings and made of the material having a linear expansion coefficient substantially similar to that of the shaft, and the second cylindrical sleeve which is fixed to the first cylindrical sleeve at one end portion thereof and to the inner peripheral surface of the arm holder at the other end portion thereof and made of the material having a linear expansion coefficient substantially similar to that of the arm holder so that the difference of the linear expansion coefficients of the shaft, the bearings and the first cylindrical sleeve becomes substantially zero. Therefore, it can be successfully avoided to release of the pre-load on the bearings or operate of excess load on the bearings due to significant variation of the ambient temperature. Furthermore, since it becomes possible to avoid deformation of the arm holder due to thermal stress, the thermal off track of the magnetic heads can be remarkably reduced to improve reliability of the magnetic disk apparatus.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A magnetic head positioner for a magnetic disk apparatus, comprising:
    an arm holder rotatably supported on a shaft by a plurality of bearings and providing a plurality of arms carrying magnetic heads for writing and reading data at tip ends thereof;
    a first cylindrical sleeve interposed between said bearings and said arm holder and fixed to the outer peripheral surface of said bearings, and being made of a material having substantially the same linear expansion coefficient as that of said shaft; and
    a pair of second cylindrical sleeves interposed between said bearings and said arm holder, each fixed to said first cylindrical sleeve at one end portion thereof and to an inner peripheral surface of said arm holder at the other end portion thereof, and being made of a material having substantially the same linear expansion coefficient as that of said arm holder;
    wherein said first cylindrical sleeve has first grooves for engaging with said second cylindrical sleeves at both ends, each of said pair of second cylindrical sleeves having a second groove for engaging with said first cylindrical sleeve at one end, said first sleeve and said pair of second sleeves being fixed to each other by press fitting with engagement of said first and second grooves.

2. The magnetic head positioner as claimed in claim 1, wherein said first and pair of second cylindrical sleeves are fixed to each other by an adhesive.

3. The magnetic head positioner as claimed in claim 2, wherein said adhesive is an adhesive including epoxy resin.

\* \* \* \* \*